Aug. 18, 1931.　　　　P. HÄNEL　　　1,818,990
POT PRESS
Filed Aug. 23, 1929　　2 Sheets-Sheet 2
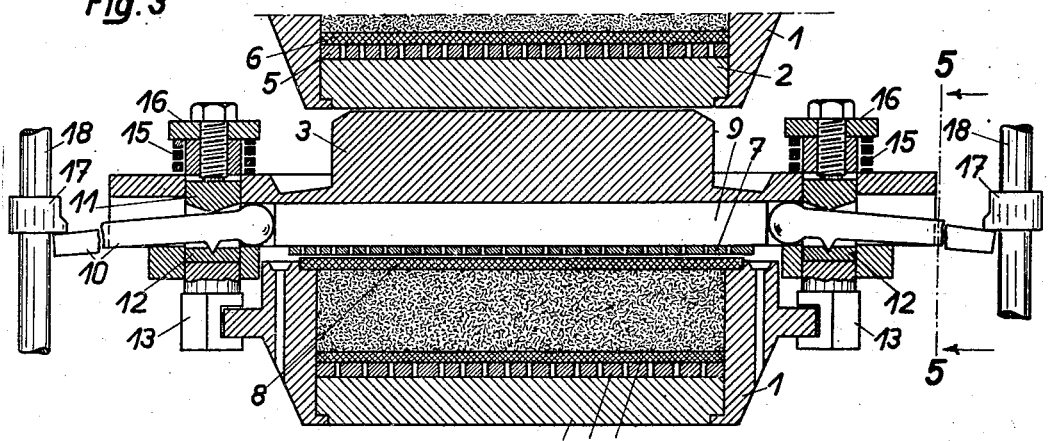
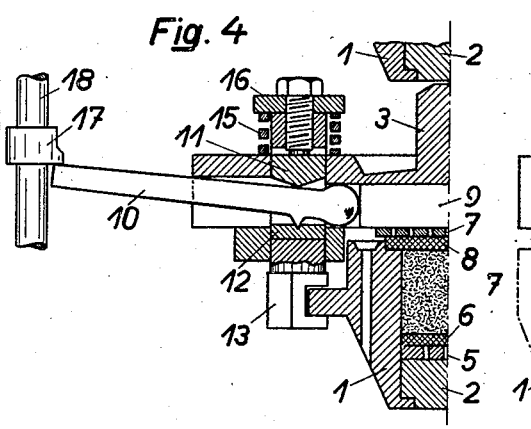
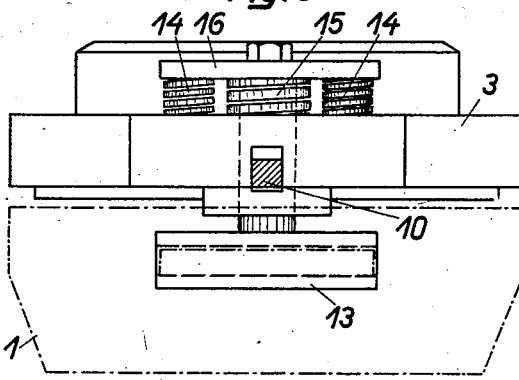
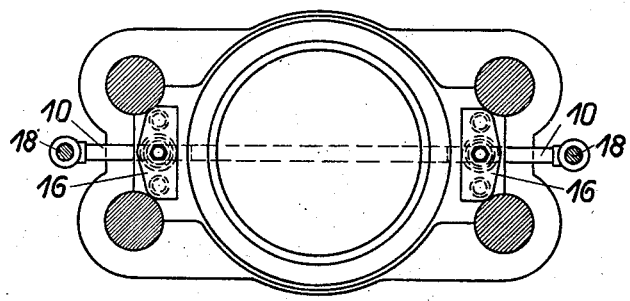
Paul Hänel
by C. P. Goepel
his Attorney.

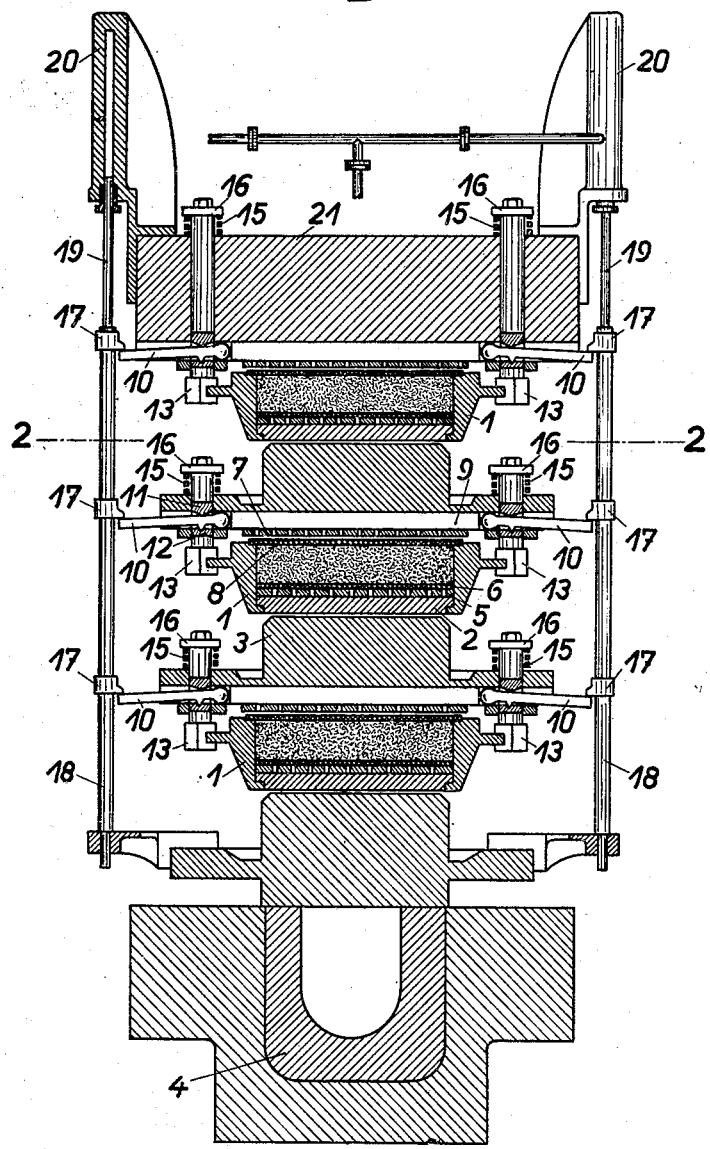

Patented Aug. 18, 1931

1,818,990

UNITED STATES PATENT OFFICE

PAUL HÄNEL, OF DRESDEN, GERMANY, ASSIGNOR TO THE FIRM J. M. LEHMANN, OF DRESDEN-A., GERMANY

POT PRESS

Application filed August 23, 1929, Serial No. 387,879, and in Germany September 10, 1928.

This invention relates to pot presses, such as are commonly used for removing the oil from liquid cocoa mass, an example of which may be seen in Patent No. 1,605,836, issued to me on November 2, 1926.

In pot presses of this type, after the pots have been filled with the cocoa mass, the filter plates are applied, and the several pots are then tightly pressed against the interposed pressure heads through the medium of which movement is transmitted to the pistons within the respective pots. After the pressing operation is completed, in order to remove the press cakes from the pots, they are loosened or separated from the pressure heads and then displaced from the column laterally with respect to said heads. In the original type of such presses, each pot was provided with an individual tightening device consisting of a wedge member manually operated to tighten the pot against the pressure head and release the same. In later constructions, springs and pressure bars were used for tightening and loosening the press pots and were simultaneously operated by a common hydraulically actuated means.

It is the general object and purpose of my present invention to provide such a pot press wherein the principle of the old wedge tightening type of press is employed but in which said wedging means operates only to loosen the pots from the press heads and is actuated as in the modern press by means which simultaneously releases all of the pots.

In one practical embodiment of the invention, the pot guides which slidably support the pots for movement to and from their operating positions in connection with the press heads, are provided with compression springs which act to tighten the pots against the interposed pressure heads. These guides are movably supported in the pressure heads and are operated against the action of said springs by pivoted levers. The free ends of all of the levers on opposite sides of the press are simultaneously engaged by hydraulically actuated means and said levers moved in one direction to thereby simultaneously disengage or release the pots from the pressure heads.

With the above and other objects in view, the invention consists in the improved pot press, and in the form, construction and relative arrangement of its several parts as will be hereinafter more fully described, illustrated in the accompanying drawings, and subsequently incorporated in the subjoined claims.

In the drawings, wherein I have illustrated one simple and practical embodiment of the invention, and in which similar reference characters designate corresponding parts throughout the several views,—

Figure 1 is a vertical sectional view through a pot press equipped with my present improvements and showing the several pots in their released or open positions with relation to the pressure heads;

Fig. 2 is a horizontal sectional view taken on the line 2—2 of Fig. 1;

Fig. 3 is a vertical central section on an enlarged scale through one of the pots and the associated pressure head showing the same in the relative poistions of Fig. 1;

Fig. 4 is a vertical fragmentary sectional view similar to Fig. 3 showing the pot in normal position closed against the pressure head, and Fig. 5 is a sectional view taken on the line 5—5 of Fig. 3, the pot being illustrated in dotted lines.

In the illustrated embodiment of the invention, the press pots 1 to receive the cocoa mass or other material from which the oil or other liquid is to be pressed, each contains a piston 2 adapted to be forced upwardly in the pot by a pressure head 3. The pressure heads and pots are alternately arranged in a vertical column and the compression of the mass in each pot is primarily effected by means of a hydraulically actuated piston 4 which directly coacts with the piston or plunger 2 in the lowermost pot.

A perforated sieve plate 5 is arranged on the upper side of each piston 2, and a filter pad 6 is superimposed upon this plate. A perforated sieve plate 7 is also secured to the under side of each pressure head 3 and against the same the filter pad 8 covering the upper open side of the pot is pressed when the pot is tightened against the pressure head.

The under side of each pressure head is provided with a diametrically extending channel or groove which receives a bar 9 forming a counterbearing for the inner rounded end of a release lever 10, said levers being mounted on opposite sides of the pressure heads and the ends of the levers associated with each head seating against the opposite ends of the bar 9. The bearings for each lever 10 also includes a fulcrum member 11 and a shim plate 12, the latter having a seat or recess in its upper face to receive a bearing projection on the lower edge of the lever 10 as clearly illustrated in Fig. 3 of the drawings. The parts 11 and 12 are carried by the upwardly extending shank of the pot guide 13 which is a familiar feature of this type of press, said shank of the pot guide being vertically movable through an opening provided in the lateral guide extension on the pressure head 3 which moves between the usual spaced vertical guide posts of the press as seen in Fig. 2 of the drawings. A compression spring 15 is arranged upon the upper end of each guide shank between the pressure head extension and a plate 16 bolted or otherwise rigidly fixed upon the upper end of said shank. Additional compression springs 14 are also interposed between the opposite ends of this plate and the guide extension on the pressure head 3. These springs 14 and 15 operate against the plate 16 to force the guides 13 with the pots mounted therein upwardly and thereby tighten the pots against the plate 7 on the lower sides of the pressure heads.

At each side of the machine, the outer ends of the vertically spaced release levers 10 are engaged by collars or other projections 17 fixed upon the vertical rods 18. The upper ends of these rods are provided with suitable plungers indicated at 19 movable in the cylinders 20 which receive suitable pressure means adapted to act upon said plungers and force the rods 18 downwardly.

In Fig. 4 of the drawings, the filled pots are shown in normal position, their upper ends being closed by the pressure heads. The pressure is released from the cylinders 20 so that the full action of the springs 14 and 15 is secured to tightly hold the pots against the pressure heads. The hydraulic ram 4 is then operated so that pistons 2 are forced upwardly in the several pots and the material therein compressed. After the completion of the pressing operation, hydraulic or other pressure fluid is supplied to the cylinders 20, thereby forcing the rods 18 downwardly and also expediting the downward movement of the ram 4 to normal position. As this ram assumes its lowermost position, the projections 17 on rods 18 acting against the levers 10 will simultaneously press the outer ends of all of the levers downwardly, the inner ends of said levers rocking upon the pressure heads 3 and the guides 13 together with the pots mounted thereon being simultaneously pressed downwardly away from the respective pressure heads 3 and the upper cross head 21. Thus the pots are quickly released so that they can be shifted laterally in the guides 13 to one side of the vertical column for the purpose of removing the press cake and then refilling the pot.

It is of course, understood that in place of compression springs 14 and 15, tension springs may be used, in which case the outer ends of the levers will be forced upwardly instead of downwardly to release the pots.

From the foregoing description considered in connection with the accompanying drawings, the construction, manner of operation and several advantages of my present improvements will be fully and clearly understood. It will be seen that by means of a very simple mechanism, all of the pots may be positively and quickly released or loosened from the pressure heads. While I have herein shown and described a simple and preferred embodiment of the essential features of my present improvements, it is nevertheless to be understood that the same may also be incorporated in various other alternative structures, and I accordingly reserve the privilege of resorting to all such legitimate changes therein as may be fairly embodied within the spirit and scope of the invention as claimed.

I claim:

1. In a pot press, a column of alternating pots and press heads for pistons in the respective pots, means individual to the respective pots acting to hold the same normally in tight contact with the under side of the adjacent press head to close all of the pots prior to the pressing operation, a relatively movable operating member for each of said means carried by the associated press head, and means to simultaneously engage and actuate all of said members to thereby simultaneously release all of the pots from contacting engagement with the associated press heads.

2. In a pot press, a column of alternating pots and press heads for pistons in the respective pots, means individual to the respective pots acting to hold the same normally in tight contact with the under side of the adjacent press head to close all of the pots prior to the pressing operation, each of said means including a spring controlled pot support, a pivoted operating lever for each of said pot supports, and means to simultaneously engage and actuate all of said levers to move the pot supports in one direction and simultaneously release all of the pots from contacting engagement with the associated press heads.

3. In a pot press, a column of alternating pots and press heads for pistons in the respective pots, means individual to the respective pots acting to hold the same normally in tight contact with the under side of the adjacent press head to close all of the pots prior to the pressing operation, each of said means including a movable pot support mounted on one of the press heads and spring means coacting with said support to urge the same in one direction and retain the pot in normal position relative to the press head, levers pivotally mounted on the press heads and coacting with the pot supports, and means to engage and simultaneously move all of the levers in one direction to move the pot supports against the action of said spring means, and thereby simultaneously release the pots from contacting engagement with the associated press heads.

4. In a pot press, a column of alternating pots and press heads for pistons in the respective pots, movable supports for each pot mounted on the associated press head, means yieldably urging the supports in one direction to close the pot against the press head, means on each press head cooperating with the supports to move the same in the opposite direction, and means for simultaneously actuating all of the last named means on all of the press heads to thereby release the pots from contact with the associated press heads.

In testimony that I claim the foregoing as my invention, I have signed my name hereto.

PAUL HÄNEL.